United States Patent [19]
Hutner

[11] Patent Number: 4,601,394
[45] Date of Patent: Jul. 22, 1986

[54] ZIP CODE SORTER FOR ARTICLE LABELING SYSTEM

[75] Inventor: Mark A. Hutner, Glenview, Ill.

[73] Assignee: Xerox Corporation, Stamford, Conn.

[21] Appl. No.: 607,872

[22] Filed: May 7, 1984

[51] Int. Cl.[4] .......................... B07C 1/00; G06F 15/20
[52] U.S. Cl. ...................................... 209/3.3; 209/551; 209/584; 209/900; 364/478; 414/32; 414/901
[58] Field of Search .................................. 209/3.1-3.3, 209/546, 548, 549, 551, 552, 563-566, 569, 583, 584, 900; 377/8, 16, 26, 39, 52; 364/478; 414/901, 32

[56] References Cited

U.S. PATENT DOCUMENTS

| | | | |
|---|---|---|---|
| 3,300,066 | 1/1967 | Henig et al. | 214/11 |
| 3,459,300 | 8/1969 | McGuire | 209/551 |
| 3,757,939 | 9/1973 | Henig | 209/900 X |
| 4,014,784 | 3/1977 | Dunlap | 209/900 X |
| 4,167,476 | 9/1979 | Jackson | 209/3.3 |

*Primary Examiner*—Robert B. Reeves
*Assistant Examiner*—Edward M. Wacyra
*Attorney, Agent, or Firm*—Frederick E. McMullen

[57] ABSTRACT

A zip code sorter for an article labeling and stacking system of the type having a labeling head for applying address labels to articles and a stacker for stacking the addressed articles, the labels having control marks identifying the end of a zip code group, with a mode selector for programming either split or oversize stacking, a look ahead counter for programming a minimum stack count, a stack counter for programming a maximum stack count, and a control responsive to selection of split stack mode to establish a threshold count whereat looking ahead for a change of zip code group mark is commenced so that when the threshold count is reached, scanning of the labels for a change in zip code group mark is commenced at an upstream label count equal to the count for which the look ahead counter is programmed, the control responding to detection of an end of zip code group mark to set the eject flag for the stack currently being stacked and assure a last stack in the zip code group having the minimum stack count.

6 Claims, 10 Drawing Figures

ZIP CODE SORTER FOR ARTICLE LABELING SYSTEM

The invention relates to a control and method for sorting and stacking articles by Zip Code, and more particularly, to an improved control for sorting and stacking articles in which all stacks formed have at least a predetermined minimum height.

Systems for processing articles such as letters, magazines, newspapers, and the like for bulk mailing normally include a labeling machine for placing address labels on the articles and an output stacker for stacking the addressed articles in stacks or bundles ready for discharge or for further processing. System control data is usually printed on the labels themselves in the form of marks, such marks identifying various items of information such as end of a Zip Code group, divert, and the like. During the process, the labels are scanned for control data by scanner means and the information obtained used to program the various operating components of the system.

The United States Post Office provides certain advantages and economic incentives when bulk mailing articles if certain regulations relating to article stack or bundle size are complied with. Typically, these Post Office regulations control both the maximum and minimum height of the article stacks or bundles which the Post Office will handle at the reduced rate.

In the past, the usual method for controlling stack size was to allow an oversize stack to be built when only a few articles were left in the Zip Code group. Since this would result in occasionally oversize stacks, this arrangement could only be employed in cases where a larger than normal stack is acceptable. It would not however entitle one to the economic savings represented by the above discussed Post Office regulations.

In another prior art system, represented by U.S. Pat. No. 4,167,476, stacks or bundles which are within the height restrictions imposed by the Post Office regulations are processed normally. However, in the case where the number of articles at the terminal end of a Zip Code group are insufficient to provide a stack of bundle of the minimum required height, the less than minimum height stack or bundle created is shunted from the main stream for special handling. Because of the special handling required, a portion of the savings accrued through the Post Office regulations is lost.

The invention relates to a labeling system including a labeling head for addressing articles and stacking means for stacking the articles, the combination of: stack counter means programmable for a maximum stack count; look ahead counter means programmable for a minimum look ahead stack count; look ahead scanning means for looking ahead to the point where a control decision for operating the stacking means is required for a change in Zip Code group mark, the look ahead scanning means looking ahead by a label count at least equal to the minimum look ahead stack count; and control means responsive to attainment of the minimum look ahead stack count or detection of a change in Zip Code mark to set a flag at the stacking means decision point terminating the article stack in process whereby where the article stacking is terminated in response to detection of a change in Zip Code mark, there are reserved a number of articles equal to said minimum look ahead stack count for the last stack in the Zip Code group.

IN THE DRAWINGS

Figure 1:
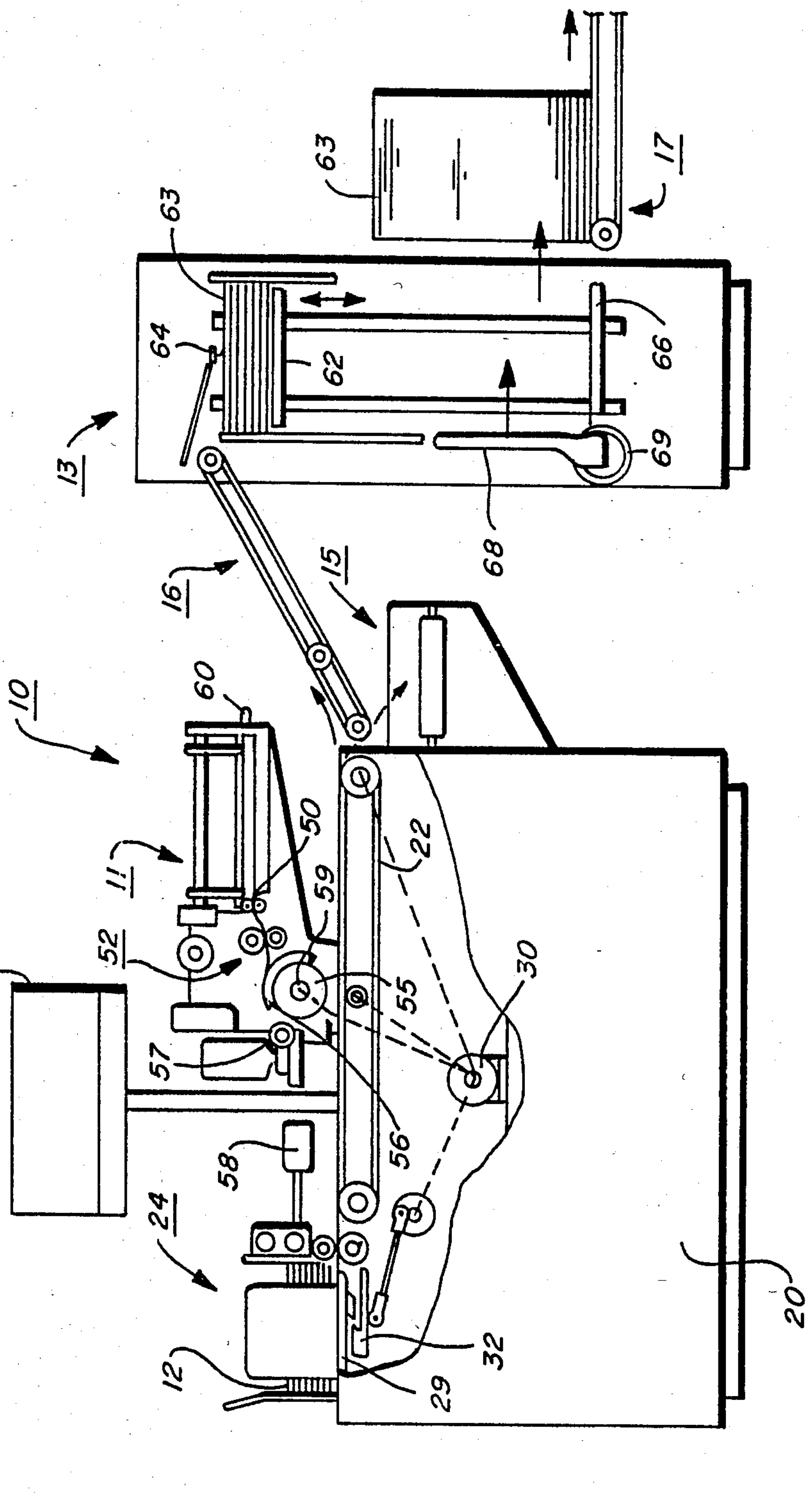
FIG. 1 is a view partially in section of a labeling system with a labeling head for applying address labels to articles and a counter/stacker for arranging the labeled articles in stacks incorporating the Zip Code sorter of the present invention.
Figure 2:
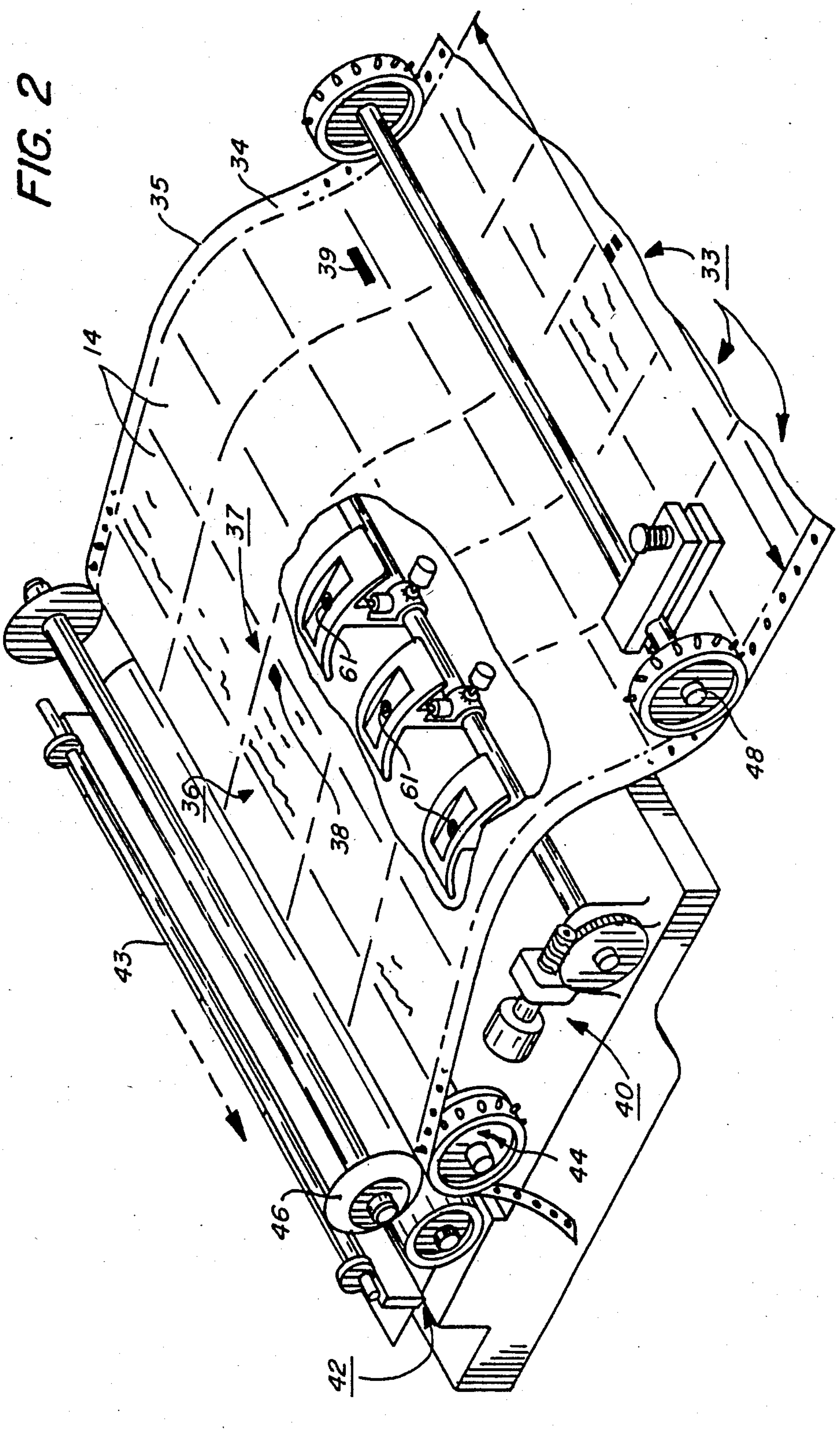
FIG. 2 is an isometric view schematically depicting details of the label transport for the labeling head shown in FIG. 1.

Referring particularly to FIGS. 1 and 2 of the drawings, there is shown a labeling system, designated generally by the numeral 10, for applying address labels 14 to articles 12 such as envelopes incorporating the Zip Code sorter of the present invention. Labeling system 10 includes a labeling head 11 and counter/stacker 13 for optionally stacking the labeled articles operatively connected through article divert station 15 and counter/stacker infeed conveyor 16. The article stacks 63 are output by counter/stacker 13 onto an output conveyor 17 which may transport the article stacks to a discharge point or to a further processing station such as a strapper.

A base 20 is provided, base 20 having a feeder conveyor 22 for transporting the articles 12 to be labeled from an autoloader 24 to labeling head 11. The articles 12 to be labeled are manually loaded into an autoloader 24, the sides of which are adjustable to accommodate various article sizes. A reciprocating article feeder shuttle 29 advances the bottommost article forward to feeder conveyor 22. Feeder shuttle 29 is drivingly coupled to a drive motor 30 through a shuttle disconnect 32, the latter permitting feeding of articles to be interrupted as required.

Labels 14 are in the form of an endless sheet similar to computer fanfold having perforated side margins 34 and plural rows 33 of labels 14 thereacross. For purposes of explanation, a 5 row or 5-up label form is shown and described herein. It will be understood however that the number of label rows 33 may vary from one to any desired multiple. Typically, the address information on labels 14 is generated by a computer with the labels printed by a computer controlled printer on label form 35.

Each label 14 is conveniently divided into an address section 36 where the addressee's name, numer and street, city and Zip Code are carried, and a control section 37 where control marks or indicia such as end of a Zip Code group mark 38, divert mark 39, etc. are provided.

Labeling head 11 includes a label transport, designated generally by the numeral 40, and a guillotine 42, transport 40 feeding label form 35 from a supply (not shown) to guillotine 42 where the label form 35 is cut transversely into strips 43. For this purpose, label transport 40 includes a pair of pinwheels 44 engagable with perforated margins 34 in label form 35. Suitable cutting discs 46 downstream of pinwheels 44 remove the side margins 34 prior to cutting of the label form by guillotine 42. Sprocketted tension wheels 48 serve to tension label form 35 as the form is being advanced.

The label strips 43 discharged by guillotine 42 are advanced by feed roll pair 50 along a path substantially at right angles to the direction of feeding of label form 35 to a label cut-off roll pair 52 where the individual labels are cut off from strip 43. Cut-off roll pair 52 are designed to advance the individual labels 14 in synchronism with rotation of a label wheel 55 having one or more label pads 56 on the periphery thereof for receiving the labels. Label wheel 55, which incorporates suitable vacuum holddown means to temporarily attach the labels 14 to label pad 56, carries the labels past an adhesive applicator or activator 57 and thereafter brings the adhesive surface of the label into physical contact with the articles passing therebelow on feeder conveyor 22 to apply the label to the article.

A sensor 58 is provided for detecting each article 12 brought forward to labeling head 11 by feeder conveyor 22. A head shaft sensor 59 responds to each revolution of the labeling head shaft 54 while label strip sensor 60 responds to up and down movement of guillotine 42.

As the label form 35 is fed forward to guillotine 42, the labels 14 are scanned for the presence of control marks, such as end of Zip Code group mark 38, divert mark 39, etc. by sensors 61. Various other types and arrangements of control marks on labels 12 may be readily envisioned.

Articles 12, following labeling by labeling head 11 pass to divert station 15 where the labeled articles may be diverted onto a divert conveyor in response to detection of a divert mark 39 or passed on to counter/stacker infeed conveyor 16. Infeed conveyor 16 discharges the labeled articles onto stacking elevator 62 of counter/stacker 13 where the articles are stacked in stacks 63 of predetermined height. Stacking elevator 62 is supported for vertical up and down movement between an upper stack/start position and a lower stack eject position, the latter being below the level of output conveyor 17. As will be understood, elevator 62 is gradually lowered as the number and hence the height of the article stack 63 being formed thereon rises. On completion of a stack, elevator 62 is lowered to the lower stack eject position to permit ejection of the completed stack onto output conveyor 17. To monitor the height of the article stack being formed on elevator 62, a suitable stack height sensor 64 is provided.

To permit the completed stacks to be ejected, a stack interceptor 66 is interposed in the path of article stacking elevator 62, interceptor 66 serving to intercept and separate the completed stack from elevator 62 for transfer to output conveyor 17. A stack ejector 68 is driven forward to slide the stack resting on interceptor 66 onto output conveyor 17. A suitable drive motor 69 is provided for raising and lowering stack elevator 62 and for moving stack ejector 68 forward and backward, motor 69 being coupled to elevator 62 and ejector 68 by suitable coupling means.

United States postal regulations provide economic incentives if the addressed articles 12 are grouped in accordance with common Zip Code and arranged in stacks 63 of at least a predetermined minimum height and not exceeding a predetermined maximum height. This mode of operation is referred to as SPLIT STACK mode herein. In other cases, it is desirable to simply arrange the labeled articles 12 in stacks having a predetermined maximum height, it being understood that the number of articles in any stack formation is determined by the article thickness. To accommodate situations where a small number of articles remain in a Zip Code group after the maximum stack height is achieved, the additional articles are added in the last stack even though the height of the last stack exceeds the maximum limit. This mode of operation is referred to herein as OVERSIZE STACK mode. In some cases as for example in the case of special addresses, it is desirable to not stack the articles and in that instance the article is diverted at divert station 15. In this case the article label bears a divert mark 39.

Figure 3:
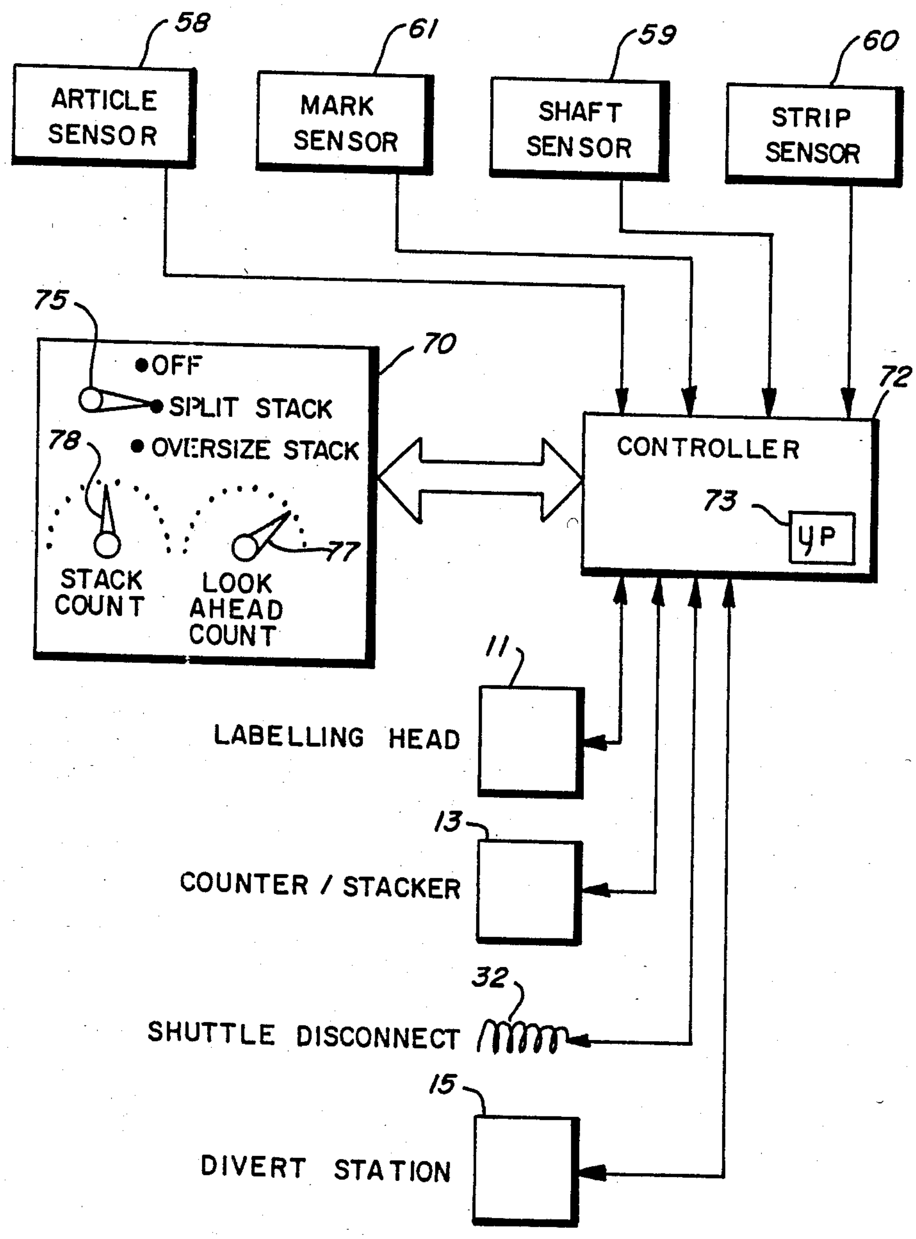
FIG. 3 is a control schematic of the control system for the labeling system shown in FIG. 1.

Referring particularly to FIG. 3, base 20 of labeling system 10 has a suitable control/display panel 70 (referred to as front panel herein) for enabling the system operator to program the desired labeling job. A suitable controller 72 including a microprocessor 73 and suitable memory for controlling labeling system 10 in accordance with the program instructions input through front panel 70 is provided. Suitable clock means (not shown) are provided for timing and synchronizing operation of the various labeling system components with one another.

To enable the operator to select the desired operating mode, i.e. OFF, SPLIT STACK mode, or OVERSIZE STACK mode, for labeling system 10, a mode selector 75 is provided on front panel 70. To permit the operating parameters of counter/stacker 13 to be set when operating in either the SPLIT STACK mode or OVERSIZE STACK mode, operator settable article counters in the form of look ahead counter 77 and stack counter 78 are provided on front panel 70. In the exemplary arrangement shown and described, look ahead counter 77 is a decrementing counter while stack counter 78 is an incrementing counter. Other counter types may, however, be readily envisioned. Suitable means such as thumbwheels are provided on front panel 70 for setting counters 77 and 78.

OPERATION

During operation of labeling system 10, mode selector 75 on front panel 70 is set by the operator to the mode desired, i.e. OFF, OVERSIZE STACK mode, or SPLIT STACK mode. Where mode selector 75 is set for SPLIT STACK mode, each article stack 63 formed by counter/stacker 13 has at least a predetermined minimum number of articles 12 therein as determined by the setting of look ahead counter 77 on front panel 70 and no more than a predetermined maximum number of articles therein as determined by the setting of stack counter 78. As an example, look ahead counter 77 may be set to 10 while stack counter 78 may be set to 25. Accordingly, in that example, each stack 63 output by counter/stacker 13 will have at least 10 articles but no more than 25.

Where mode selector 75 is set for the OVERSIZE STACK mode, each stack formed by counter/stacker 13 will ordinarily have a predetermined maximum number of articles (i.e. 25) determined by the setting of stack counter 78. However, where the end of a Zip Code group is impending and a small number of additional articles in the Zip Code group are left over, counter/stacker 13 is allowed to continue stacking the articles in the last stack even though the stack limit is exceeded. The article count by which the stack limit may be exceeded is determined by the setting of look ahead counter 77 on front panel 70. For example, if look ahead counter 77 is set to 5 with the stack counter 78 set to 25, and three additional articles remain before the end of the Zip Code group, counter/stacker 13 would continue to stack the articles even though the stack limit is exceeded. As a result, the last stack for the Zip Code group would contain 28 articles.

Figure 4:
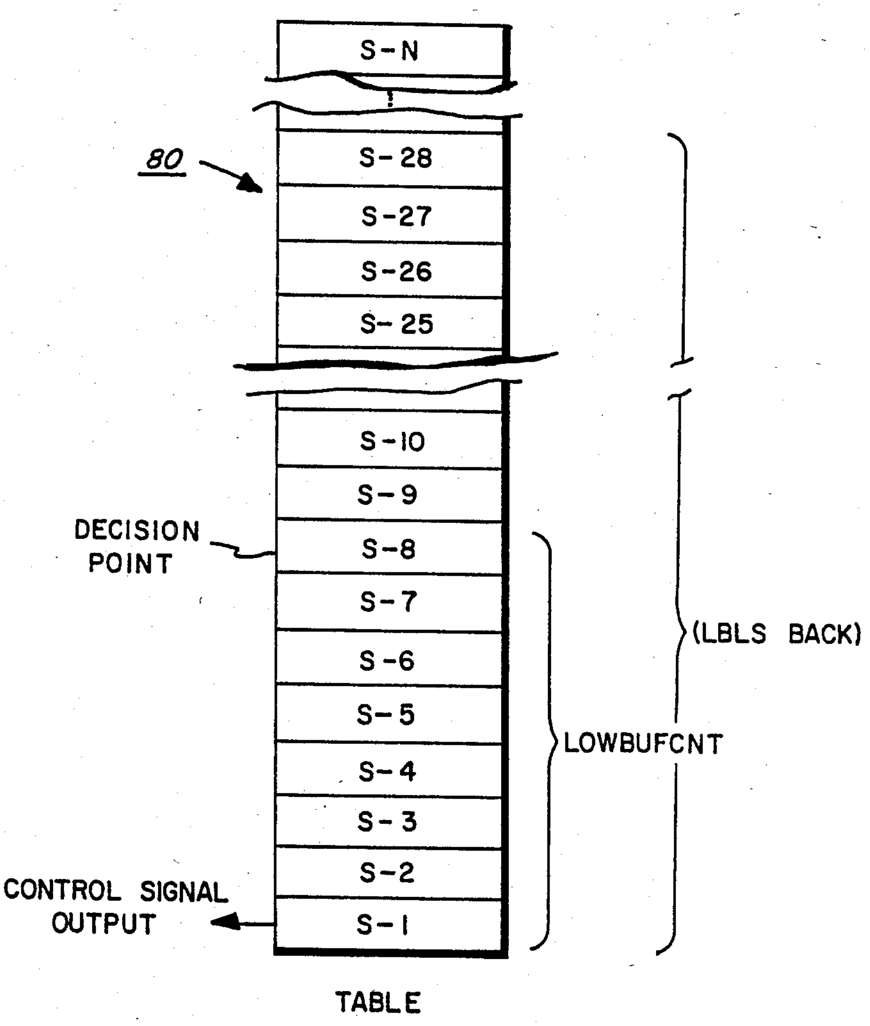
FIG. 4 is a view depicting a dynamic table in which control information for operating the counter/stacker as a Zip Code sorter in accordance with the teachings of the invention is held.

Referring particularly to FIG. 4, an operating table 80 is provided having a succession of stages S1, S2, . . . Sn wherein the timing parameters for operating counter/stacker 13 are held. The last stage S1 of table 80 represents the point at which the control instructions (i.e. eject flag) for counter/stacker 13 are read. The decision for operating stack ejector 68 of counter/stacker 13 is made at a point, identified as the low buffer count (LOWBUFCNT), upstream of stacker 13 in order to carry out the function programmed. For example, the low buffer count may be 8 and in that case the counter/stacker decision point is at stage S8. Thus for example, the eject flag (EJECT NOW) for operating ejector 68 of counter/stacker 13 is set at a count 8 articles ahead of the point (i.e. stage S1) in table 80 where the control information is read. As described, label sensors 61 scan the labels 14 on label form 35 for control marks such as end of Zip Code group mark 38 at a point termed the labels back count (LBLS BACK). This point may for example be 32 labels ahead of the decision point (i.e. stage S8) in table 80. It will be understood that various types of labeling operations, such as an article divert, may work to effectively shorten the labels back count.

Figure 5:
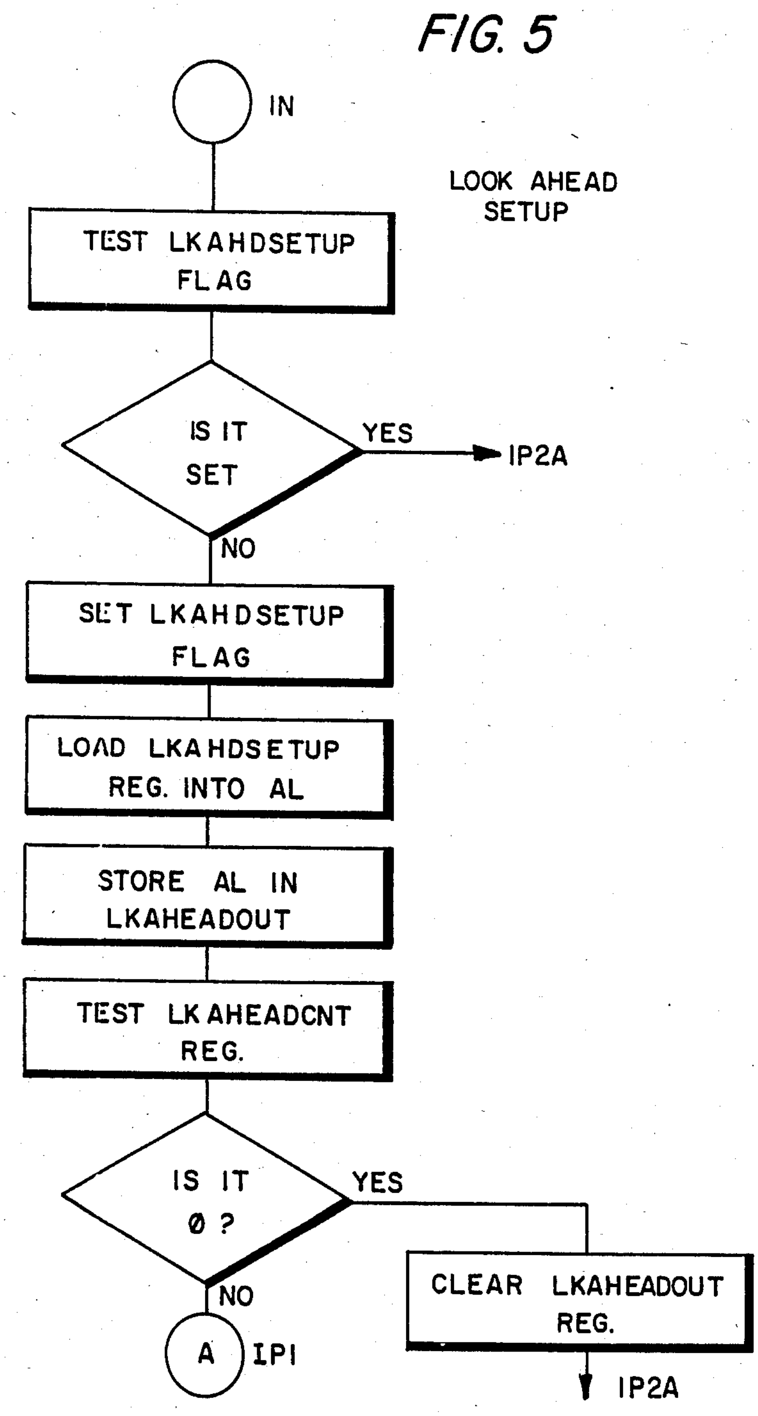
FIGS. 5, 6, 7, 8*a*, 8*b*, and 8*c* are flow charts depicting the operating steps of the Zip Code sorter of the present invention.

Referring particularly to FIG. 5 and Table I (Look Ahead Setup), initially, after testing the Look Ahead Setup, the setting of mode selector 75, i.e. OFF, SPLIT STACK mode, or OVERSIZE STACK mode, is loaded (MOV AL, LAHEADMOD). The look ahead count on front panel 70 is tested to see if a count has been programmed (TEST LKAHEADCNT,DH). If not, look ahead for SPLIT STACK or OVERSIZE STACK mode is turned off (MOVLKAHEADCNT CH) since there is no look ahead count to look ahead to.

Figure 6:
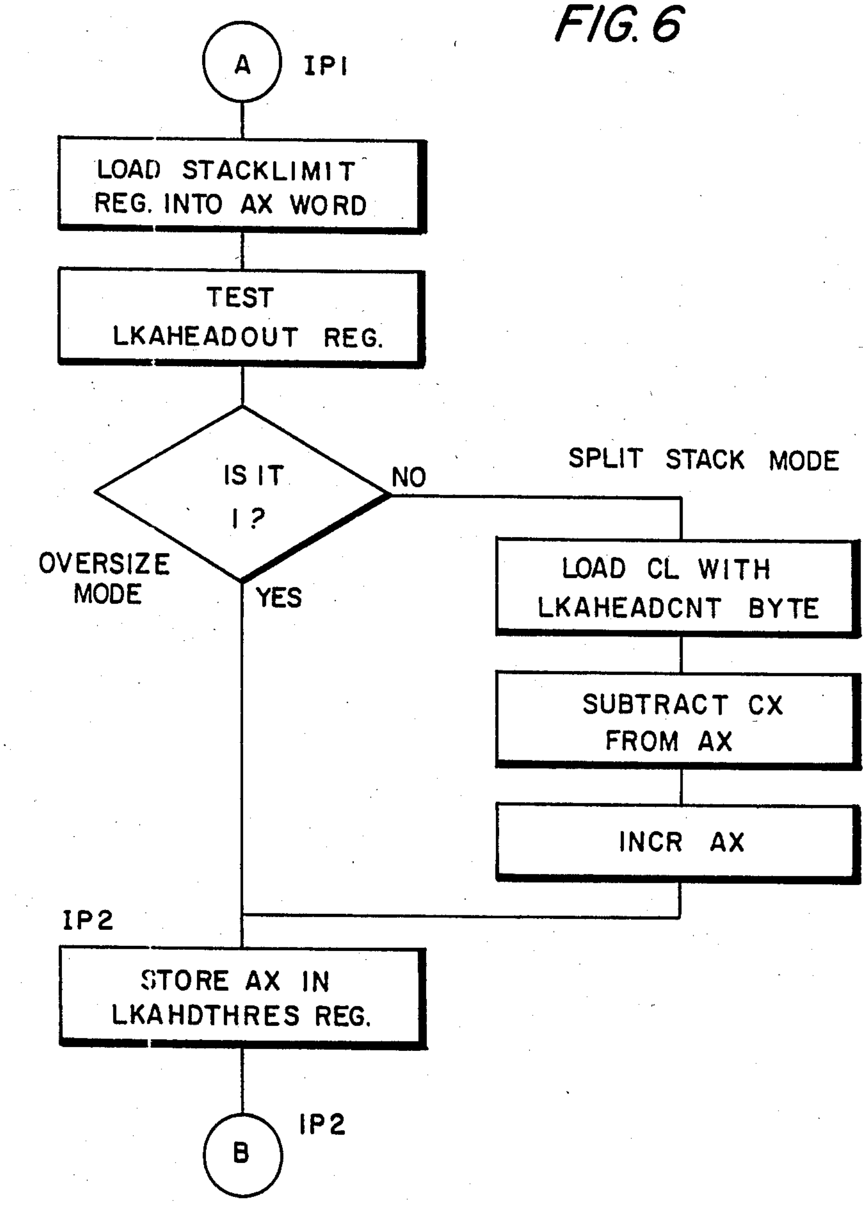

Referring to FIG. 6 and Table II, a threshold count (LKAHDTHRES) is calculated by subtracting the stack limit count (STACKLIMIT) set by stack counter 78 from the look ahead count (LKAHEADCNT) programmed by counter 77 and adding 1 (INC AX) to the difference obtained. In the example referred to above, the threshold count would equal 16 ($25-10+1=16$). Accordingly, during stacking, look ahead for the next change in Zip Code mark would not commence until the stack count reached 16.

Figure 7:
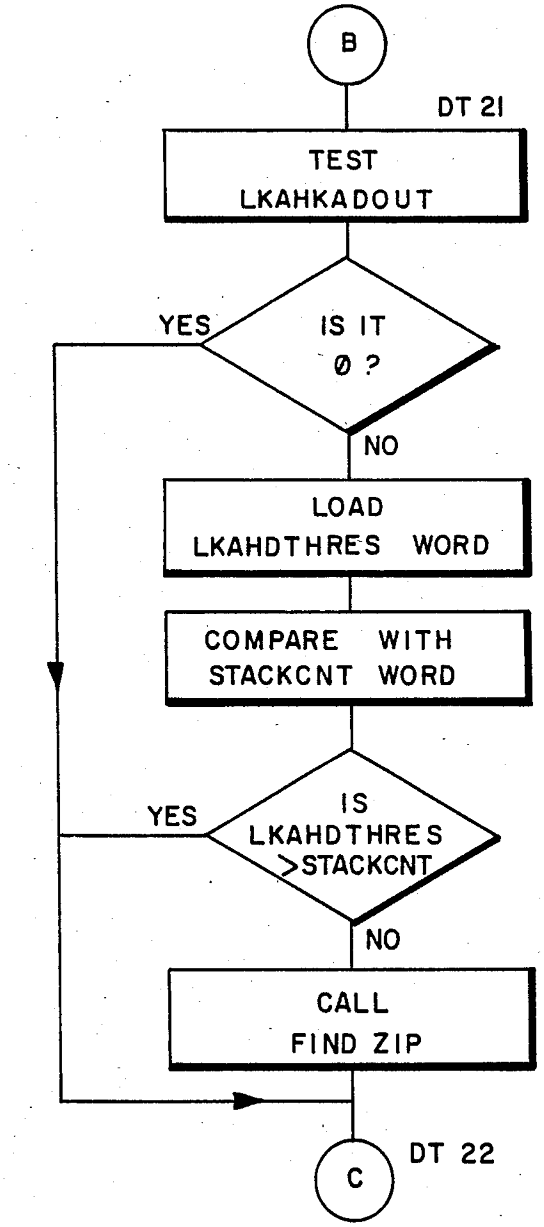
Figure 8A:
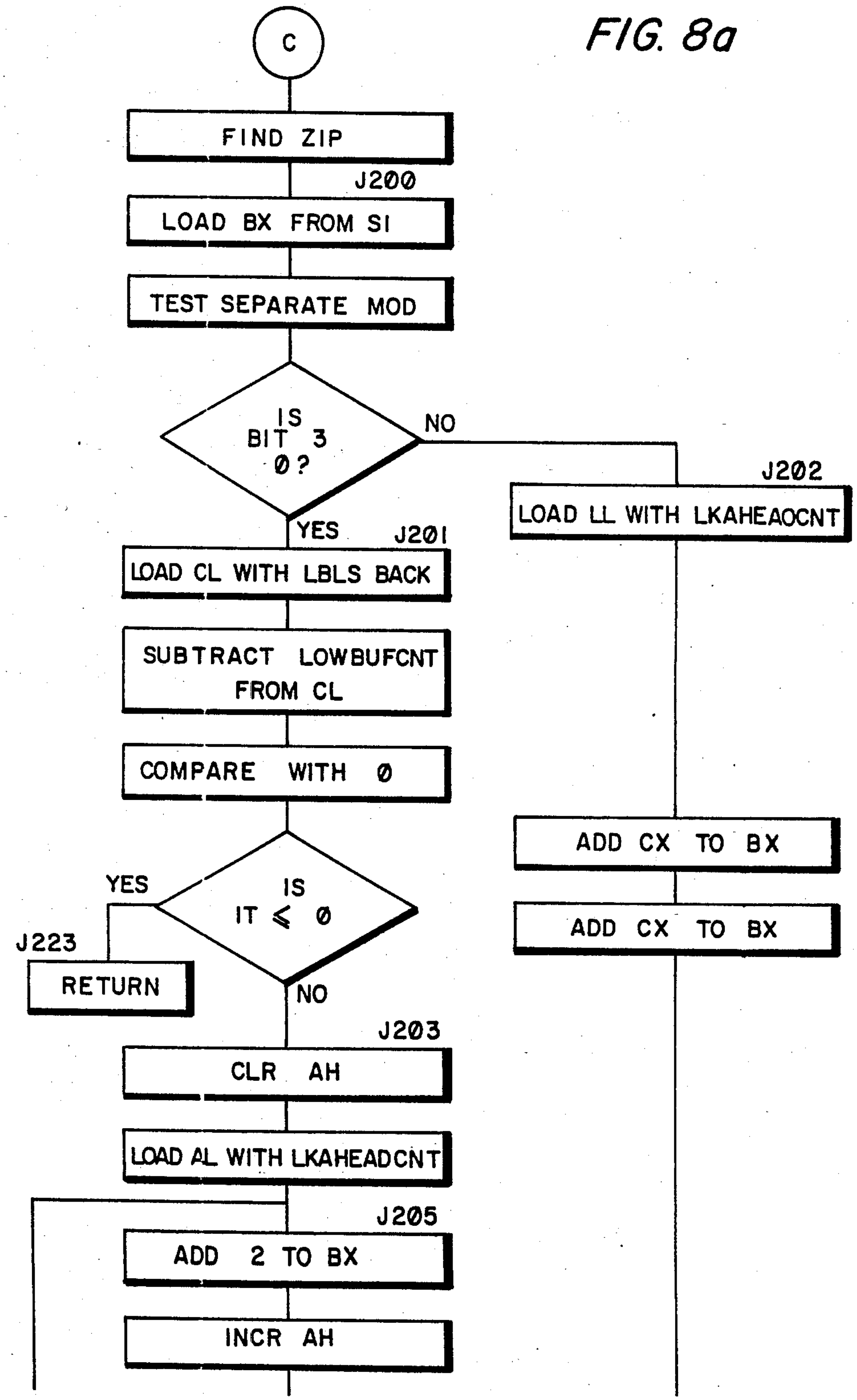
Figure 8B:
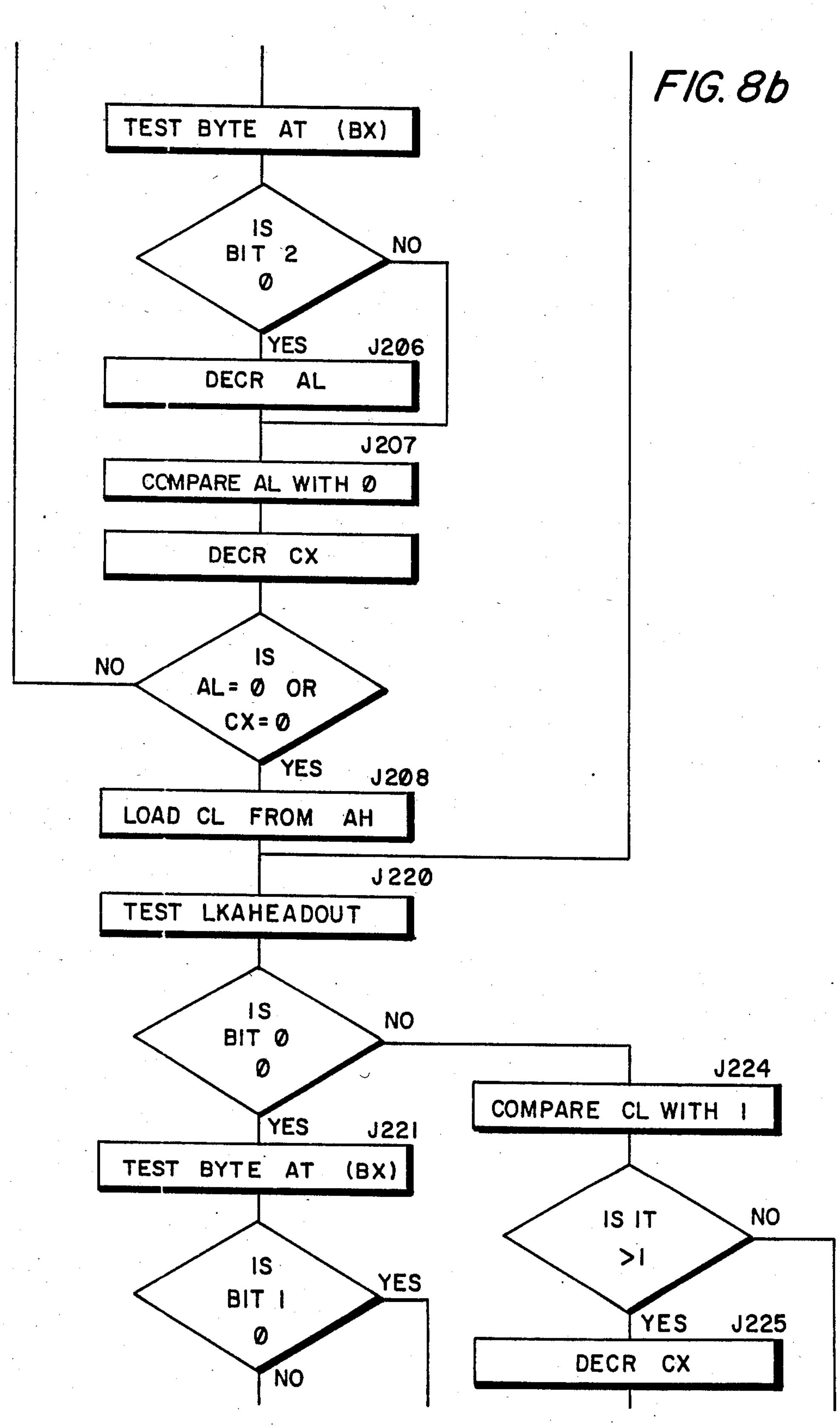
Figure 8C:
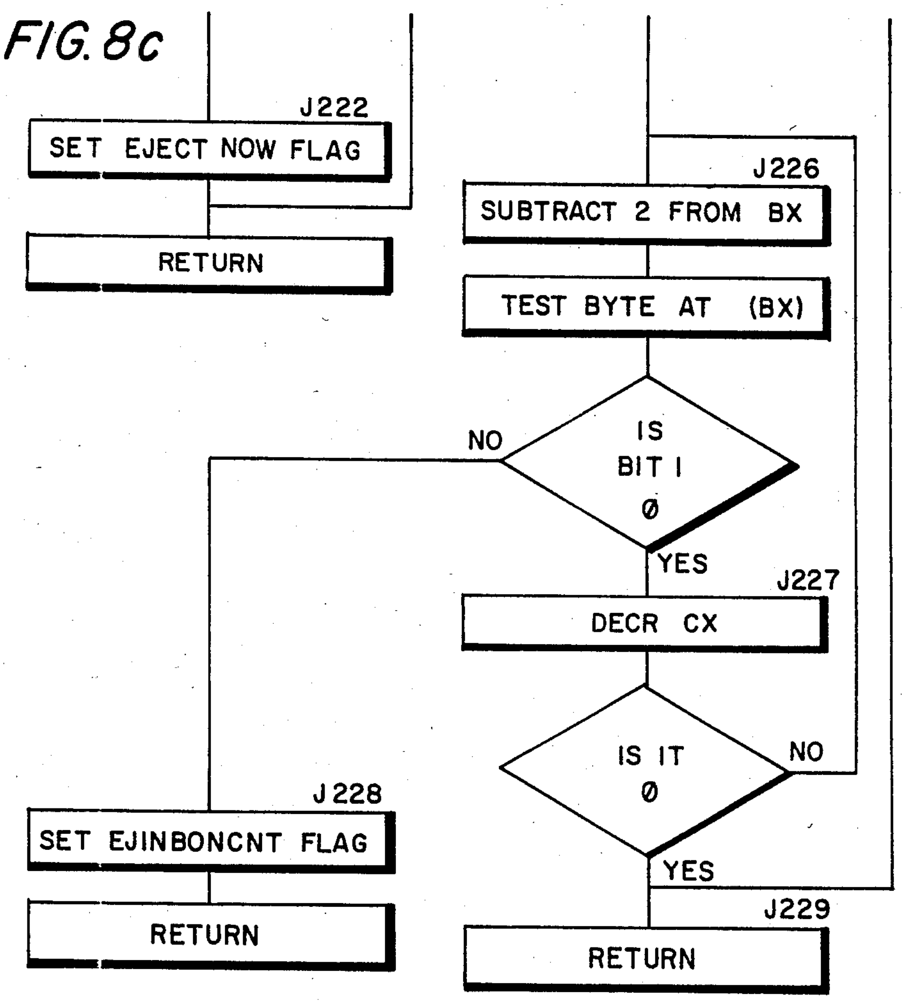

Referring to FIG. 7 and Table III, during stacking, the threshold count (LKAHDTHRES) and the current stack count (STACKCNT) are compared (CMP AX-,STACKCNT). If the threshold count is larger than the stack count, the stack count is not at a point where a check for an impending Zip Code change is required. However, where the threshold count is equal to or less than the stack count, a check is made to see if a Zip Code group change is coming and for this purpose the Find Zip routine of FIGS. 8*a*, 8*b*, and 8*b* and Table IV is called (CALL FINDZIP).

Referring thereto, the FINDZIP routine obtains the address of the decision point in table 80 (MOV BX,SI) and a check is made to determine it the number of labels necessary for the eject cycle (LOWBUFCNT), which is computed from the front panel settings, is less than the number of labels required for look ahead (LBLS BACK). For this determination, the eject cycle count (LOWBUFCNT) is subtracted from the available label count (LBLSBACK) and the result compared with zero (CMP CL, CH). Where the count difference is less than or equal to zero, an error is declared and the operator is notified (i.e. by a signal on front panel 70) that the number of labels available for look ahead are insufficient.

Presuming that the number of labels available for look ahead are sufficient (IF>0, OK), the look ahead count is loaded (MOV AL, LKAHEADCNT) and the buffer address to be checked incremented (INC AH). The byte obtained is checked for the presence of a divert mark (TEST BYTE PTR[BX]S2). If no divert mark 39 is found, the look ahead count is decremented by 1 (DECR.AL). Where a divert mark is found, decrementing of the look ahead count is skipped. In either case, the labels back count (LABLSBACK), which is found in counter CX, is decremented (DECR CX) and a check made to see if either the look ahead count or labels back count is now 0.

Assuming that neither the look ahead count or labels back count is zero, a loop back is made to obtain the next location (LOOPNZ J205) to be checked and the aforedescribed process repeated.

When either the look ahead count or labels back count reaches zero, a test is made to determine if SPLIT STACK or OVERSIZE STACK mode has been selected (TEST LKAHEADOUT,S0). Presuming that SPLIT STACK mode has been selected, a check is made (TEST BYTE PTR[BX], S1) to see if either the threshold count has been reached or if a Zip Code change mark is present. If a Zip Code change mark is found, the eject now flag is set (MOV EJECTNOW,DH) at the decision point (i.e. stage S8 of table 80). Accordingly, the stack being formed, which is now the next to the last stack, will be ejected prior to reaching the stack height (STACK LIMIT) set by counter 78 leaving the minimum number of articles as set by the look ahead counter 77 available for the last stack. If the threshold count has been reached, setting of the eject now flag is skipped and return is made to repeat the aforedescribed process for the next stack.

In the example given previously, after a stack count of 16 is reached, the labels, starting at a look ahead point 10 labels ahead of the decision point, are checked for a change in Zip Code mark. If no change in Zip Code mark is found within the next 10 labels (presuming that there are no diverts), the eject now flag is set at the decision point on reaching the programmed stack height (i.e. 25) in the normal manner. However, if a change in Zip Code mark is found, the eject now flag is set. As a result, the stack being formed, which has now become the next to the last stack in view of the impending end of the Zip Code group, is ended on an article count less that the stack height programmed (i.e. 25) assuring that the minimum number of articles required to bring the last stack up to the minimum count programmed on look ahead counter 77 (i.e. 10) are provided for the last stack in the Zip Code group.

As indicated, where a divert mark 39 is found, decrementing of the look ahead count is skipped. The labels back count (LABLSBACK) however is decremented reducing the available look ahead range. In the unlikely event that the number of diverts is great enough to reduce the labels back count to a point below the look ahead count, the number remaining for stacking becomes less than the minimum number of articles (i.e. 10) for which look ahead counter 77 is set. To avoid this situation, a stack eject is made.

Where the OVERSIZE STACK mode has been selected, a single check is made for an end of Zip Code group mark 38 on attainment of the stack height for which stack counter 78 is programmed (for example 25). At that point, a check is made (TEST BYTE PTR[BX]S1) forward by the look ahead count for which look ahead counter 77 is set (i.e. 5) minus 1 (DEC. CX) for an end of Zip Code group mark. In this example, look ahead for mark 38 would be made forward through 4 labels.

Presuming that no end of Zip Code group mark 38 is found, the eject flag is set in the normal and a stack having the maximum number of articles for which stack counter 78 is set (i.e. 25) is ejected by counter/stacker group mark 38, setting of the eject flag is suppressed (MOV EJINBONCNT,DH) and ejection of the stack takes place at the end of the Zip Code group. In the example considered, if an end of Zip Code mark 38 were found at label 29, ejection of the stack on reaching 25 articles would be suppressed and ejection would not take place until the last article in the Zip Code group was added to the stack resulting in a last stack of 29 articles.

While the invention has been described with reference to the structure disclosed, it is not confined to the details set forth, but is intended to cover such modifications or changes as may come within the scope of the following claims.

TABLE I

| LOG OBJ | | LINE | | SOURCE | | LOOK AHEAD SETUP |
|---|---|---|---|---|---|---|
| | =1 | 1548 | +1 | % 1C('F1'INPUT MO) | | |
| | =1 | 1549 | | OCT. 6, 1903 REV. 3 | | |
| | =1 | 1550 | | INPUT PROCESS | | |
| 06F5 8436E100 | =1 | 1551 | | IP00' | TEST LKAHDSETUP, OH | CHECK LOOKAHEAD SETUP |
| 06F9 752A | =1 | 1552 | | | JNZ IP2A | IF SET, NO ACTION |
| | =1 | 1553 | | | | IF NOT SET, INITIALIZE |
| 06FB 8O36E100 | =1 | 1554 | | IP0' | MOV LKAHDSETUP, OH | SET LKAHDSETUP FLG |
| 06FF AOO800 | =1 | 1555 | | | MOV AL, LKAHEADMOD | LOAD LOOK AHEAD MODE FROM FRONT PANEL |
| | =1 | 1556 | | | | 0-OFF, 1-OVERSIZE, 2-SPLIT |
| 0702 A2E400 | =1 | 1557 | | | MOV LKAHEADOUT, AL | STORE IN LOOKAHEAD OUTPUT, THIS IS RESET IF COUNT 0 |
| | =1 | 1558 | | | | MODE |
| 0705 0436OC00 | =1 | 1559 | | | TEST LKAHEADCNT, OH | LOOK AHEAD COUNT FROM FRONT PANEL |
| 0709 7506 | =1 | 1560 | | | JNZ IP1 | IF SET, OK |
| | =1 | 1561 | | | | IF 0, TURN OFF LOOKAHEAD MODE, NO QTY TO LOOK AHEAD FOR |
| 070O OO2EE400 | =1 | 1562 | | | MOV LKAHEADOUT, CH | CLEAR LKAHEADOUT REG |
| 070F ED14 | =1 | 1563 | | | JMP SHORT IP2A | |

LEGEND
LKAHDSETUP: look ahead setup
LKAHDMOD: look ahead mode
LKAHDCNT: look ahead count
LKAHDOUT: look ahead output
LKAHDTHRES: look ahead threshold
STACKCNT: stack count
LBLSBACK: labels back
LOWBUFCNT: low buffer count
PTR: pointer
INC: increment
DCR: decrement
CMP: compare
SUB: subtract
ADD: add
MOV: move
EJINBONCNT: eject inhibit on count

TABLE II

| | | | | | |
|---|---|---|---|---|---|
| 0711 AI0301 | =1 | 1564 | IP1' | MOV AX, STACKLIMIT | |
| 0714 F606E40001 | =1 | 1565 | | TEST LKAHEADOUT, S0 | TEST BIT 0 |
| 0719 7507 | =1 | 1566 | | JNZ IPZ | IF SET, OVERSIZE MODE, STORE STACKLIMIT IN LOOKAHEAD THRESHOLD |
| | =1 | 1567 | | | IF NOT SET, SPLIT STACK MODE, SUBTRACT LKAHEADCOUNT |
| | =1 | 1568 | | | FROM STACK LIMIT & THEN STORE IN LKAHEAD THRESHOLD |
| 071B BA0EDC00 | =1 | 1569 | | MOV CL, LKAHEADCNT | |
| 071F 2OC1 | =1 | 1570 | | SUB AX, CX | |
| 0721 40 | =1 | 1571 | | INC AX | THIS SETS THRESHOLD FOR LOOKING AHEAD 1 STEP BEYOND |
| | =1 | 1572 | | | NORMAL END AT STACK COUNT |
| 0722 A3E200 | =1 | 1573 | IP2' | MOV LKAHDTHRES, AX | |

13. Where the scan forward reveals an end of Zip Code

TABLE III

| | | | | | |
|---|---|---|---|---|---|
| OE1A E843 | =1 | 2473 | | JMP SHORT OT20 | |
| 0E1C O436E400 | =1 | 2474 | DT21' | TEST LKAHEADOUT, OH | CHECK LOOK AHEAD OUTPUT TYPE |
| OE20 740C | =1 | 2475 | | JZ OI22 | IF NOT SET, LOOKAHEAD INACTIVE |
| | =1 | 2476 | | | IF SET, SEE IF STACK IS LARGE ENOUGH TO ACTIVATE |
| 0E22 A1E200 | =1 | 2477 | | MOV AX, LKAHDTHRES | COMPARE LOOK AHEAD THRESHOLD WITH STACK COUNT |

TABLE III-continued

| | | | | |
|---|---|---|---|---|
| 0E25 38060701 | =1 | 2478 | CMP AX, STACKCNT | |
| 0E29 7F03 | =1 | 2479 | JG OT22 | IF THRESHOLD GREATER, STACK NOT BIG ENOUGH YET |
| | =1 | 2480 | | IF = OR LESS, CHECK FOR IMPENDING ZIP |
| 0E28 C8C300 | =1 | 2481 | CALL FINDZIP | |

TABLE IV

FIND ZIP

| | | | | |
|---|---|---|---|---|
| | =1 | | | |
| | =1 | | | |
| | =1 | | | |
| 0EF1 | =1 | FINDZIP | PROC | PART OF LOOKAHEAD ROUTINE WHICH FINDS IMPENDING ZIP'S |
| | =1 | | | & EITHER CAUSES OR INHIBITS EJECT IF INDICATED |
| 0EF1 O8DE | =1 | J200' | MOV BX, ST | LOAD ADDR FOR DECISION POINT |
| 0EF3 F606000108 | =1 | | TEST SEPARAIMOD, 53 | |
| OEF8 749A | =1 | | J2 J201 | IF 0, STACK MODE, COMPUTE # OF LABELS NEEDED IN LOOKAHEAD |
| | =1 | | | BY IGNORING DIVERTS THAT MAY APPEAR WITHIN RANGE |
| | =1 | | | IF 1, DIVERT MODE, COUNT IS SIMPLY LKAHEADCNT |
| OEFA BA0EOC00 | =1 | J202' | MOV C1, LKAHEADCNT | SET LOOPCNT TO # OF LOOK AHEAD LABELS |
| 0EFE 03B9 | =1 | | ADD BX, CX | FORM TOP ADDR TO BE CHECKED |
| 0F00 03B9 | =1 | | ADD BX, CX | |
| 0F02 EB23 | =1 | | JMP SHORT J220 | |
| 0F04 BA0EE600 | =1 | J201' | MOV CL, LBLSBACK | AVAILABLE BUFFER |
| 0F08 2A0E8F00 | =1 | | SUB CL, LOWBUFCNT | # OF COUNTS ASSIGNED TO EJECT CYCLING |
| 0F0C 3ACD | =1 | | CMP CL, CH | CHECK FOR OVERFLOW |
| 0F0E 7E27 | =1 | | JLE J223 | IF < OR = 0, ERROR |
| | =1 | | | IF > 0, OK |
| 0F10 B400 | =1 | J203' | MOV AH, 0 | |
| 0F12 A0HC00 | =1 | | MOV AL, LKAHEADCNT | # OF LOCATIONS TO CHECK |
| 0F13 O3C302 | =1 | J205' | ADD BX, 2 | NEXT ADDR TO CHECK |
| 0F18 FEC4 | =1 | | INC AH | RUNNING TOTAL OF LOCATIONS CHECKED |
| 0F1A F60704 | =1 | | TEST BYTE PTR[OX], G2 | CHECK FOR DIVERT |
| 0F1O 7502 | =1 | | JN2 J202 | IF SET, DIVERT, NOT VALID LOCATION FOR CHECKING LOOKAHEAD |
| | =1 | | | IF NOT SET, CHECKABLE LOG |
| 0F1F FCC8 | =1 | J206' | DEC AL | ONE LESS LOG LEFT TO CHECK IN LKAHEAD, CHECK COMING UP |
| 0F21 3AC5 | =1 | J207' | CMP AL, CH | |
| 0F23 E0F0 | =1 | | LOOPHZ J205 | LOOP AS LONG AS LKAHEADCNT OR AVAILABLE MEMORY IS NOT EXHAUSTED |
| 0F25 8ACC | =1 | J208' | MOV CL, AH | # OF LOCATIONS TO CHECK FOR LOOKAHEAD, IF DIVERTS |
| | =1 | | | PRESENTS WILL BE HIGHER THAN LKAHEADCNT |
| 0F27 F606E40001 | =1 | J220' | TEST LKAHEADOUT, 50 | |
| 0F2C 750A | =1 | | JN2 J224 | IF SET, OVERSIZE MODE |
| | =1 | | | IF NOT SET, SPLIT STACK MODE |
| OF2E F60702 | =1 | J221' | TEST BYTE PTR [BX],S1 | CHECK FOR EJECT TYPE |
| 0F31 7404 | =1 | | J2 J223 | IF NOT SET, NO EJECT |
| | =1 | | | IF SET, SETUP TO EJECT MOV. EJECT JUST FOUND WILL |
| | =1 | | | CAUSE ANOTHER EJECT AT LOOKAHEAD COUNT TO FOLLOW |
| 0F33 8O368600 | =1 | J222' | MOV EJCCTNOW, OH | |
| 0F37 C3 | =1 | J223' | RET | |
| 0F38 80F901 | =1 | J224' | CMP CL,L | MAKE SURE VALUE HIGH ENOUGH TO PROCEED |
| 0F38 7E08 | =1 | | JLE J229 | IF <OR = QUANTITY TOO SMALL TO PROCESS |
| | =1 | | | IF >, OK |
| 0F38 49 | =1 | J225' | DEC CX | LOOK TO 1 LESS THAN # NEEDED IN MIN STACK |
| 0F3L 03EB02 | =1 | J226' | SWB BX, 2 | POINT TO NEXT LOWER ENTRY |
| 0F41 F60702 | =1 | | TEST BYTE PTR [OX], 51 | |
| 0E44 7503 | =1 | | JHZ 1220 | IF SET, EJECT FOUND, SUPPRESS EJECT WHICH IS |
| | =1 | | | PENDING IN THIS CYCLE |
| | =1 | | | IF NOT SET, CHECK NEXT LOWER ENTRY |
| 0F46 E2F6 | =1 | J227' | LOOP J226 | |
| 0F48 C3 | =1 | J229' | RET | |
| 0F49 88368700 | =1 | J228' | MOV EJIHBOBCNET OH | SET EJIHBONCNT, THIS WILL FORCE ZIP BREAK AT LOOKAHEAD ZIP |

TABLE IV-continued

| | | | | | |
|---|---|---|---|---|---|
| | | | | | FIND ZIP |
| | =1 | 2636 | | | JUST FOUND, NOT ON COUNT REACHED FROM FRONT PANEL |
| 0F48 C3 | =1 | 2637 | | RET | |
| | =1 | 2638 | FINDZIP | ENDP | |
| | =1 | 2639 | | | |
| | =1 | 2640 | | | |
| | =1 | 2641 | | | |

I claim:

1. In a labeling system including a supply of labels for use in addressing articles, selected labels being adapted to bear a mark identifying a change in Zip Code group; a labeling head for addressing articles with said labels and stacking means for stacking said articles in stacks following addressing by said labeling head, said stacking means including a stacking elevator, and an infeed conveyor for transporting the addressed articles from said labeling head to said stacking elevator, the combination of:

(a) stack counter means programmable for a maximum stack count of addressed articles to be stacked on said stacking elevator;

(b) look ahead counter means programmable for a minimum stack count of addressed articles to be stacked on said stacking elevator;

(c) scanning means for scanning said labels ahead of the point where the addressed articles are conveyed by said infeed conveyor to said stacking elevator whereby to allow a control decision for operating said stacking means to be made before the article addressed with a label having a change in Zip Code group mark is conveyed by said infeed conveyor to said stacking elevator, said scanning means scanning ahead of said point by a label count at least equal to said minimum stack count; and (d) control means responsive to attainment of said minimum stack count or detection of a change in Zip Code group mark to terminate stacking of the article stack in process by said stacking means, whereby where said article stacking is terminated in response to detection of a change in Zip Code group mark, the remaining articles in said Zip Code group to be stacked equal said minimum stack count.

2. The labeling system according to claim 1 including means to inhibit actuation of said scanning means until a predetermined article threshold count is reached.

3. The labeling system according to claim 2 including means for differencing the count on said stack counter means from the count on said look ahead counter means to provide said threshold count.

4. The labeling system according to claim 3 including means to divert addressed articles to another path prior to said addressed articles reaching said infeed conveyor, and means for preventing addressed articles diverted to said path from tolling said minimum look ahead count.

5. A Zip Code sorting method for a labeling system which includes a labeling head for applying address labels to articles, stacking means for stacking said articles in stacks, and control means for operating said system including programmable stack counter and look ahead counter, said address labels being adapted to carry control marks identifying a change in Zip Code group, comprising the steps of:

(a) setting said stack counter to a selected first article count representing a desired maximum stack height;

(b) setting said look ahead counter to a selected second article count representing a desired minimum stack height;

(c) calculating a threshold count from said first and second article counts;

(d) while operating said stacking means to stack said articles, counting said articles as said articles are being stacked;

(e) when the count in step d equals said threshold count, commencing scanning said address labels for a change in Zip Code group mark;

(f) terminating stacking of the stack in progress by said stacking means in response to detection of a change in Zip Code group mark or attainment of said first article count, whereby when stacking is terminated in response to detection of a change in Zip Code group mark, the number of articles remaining in said Zip Code group equal said second article count thereby assuring that the height of the last stack in said Zip Code group equals said desired minimum stack height.

6. The method of claim 5 including the step of calculating said threshold cound by differencing said first and second article counts and adding 1 to the difference obtained.

* * * * *